Nov. 24, 1970 M. T. BAGLEY 3,543,187
SINGLE ENDED BALANCED MODULATOR EMPLOYING MATCHED ELEMENTS IN DEMODULATING ARMS
Filed Sept. 11, 1968
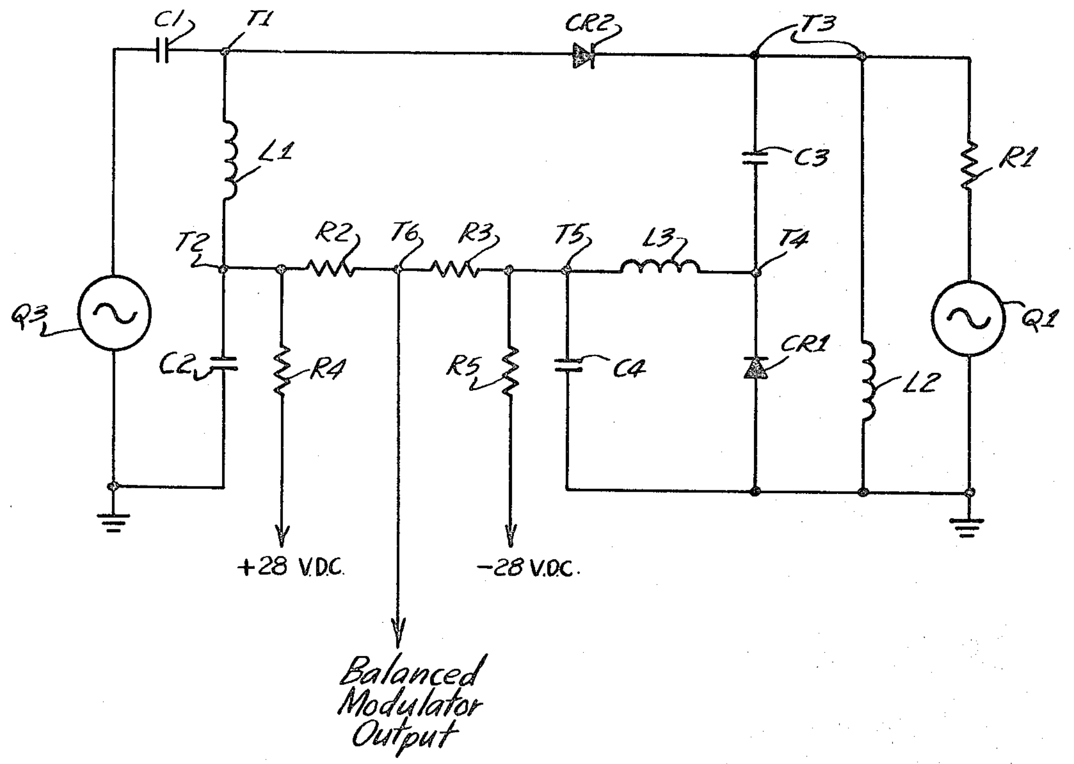
INVENTOR.
Michael T. Bagley
BY
John F. Miller Agent
Attorney United States Patent Office 3,543,187
Patented Nov. 24, 1970

3,543,187

SINGLE ENDED BALANCED MODULATOR EMPLOYING MATCHED ELEMENTS IN DEMODULATING ARMS

Michael T. Bagley, West Covina, Calif., assignor, by mesne assignments, to the United States of America Filed Sept. 11, 1968, Ser. No. 758,938
Int. Cl. H03c 3/04
U.S. Cl. 332—18 1 Claim

ABSTRACT OF THE DISCLOSURE

A single ended balanced modulator employing matched elements in demodulating arms to preserve phase and response. Matched R.F. chokes are provided to discriminate against undesired frequencies. Means are provided to insure that two diodes in two respective demodulating arms conduct in unison.

BACKGROUND OF THE INVENTION

The invention is in the field of electronic modulators. In the prior art a continuing problem has been that of maintaining equal amplitudes in two R.F. drive frequencies at different power levels in a push-pull balanced modulator. Applicant has solved this problem by employing a novel single ended balanced modulator wherein the demodulating elements are balanced against each other.

BRIEF SUMMARY OF THE INVENTION

The invention comprises a single ended balanced modulator which discriminates against unwanted noise or A.M. modulation in the input frequency. Information is taken off one side only of the R.F. envelope; therefore, noise or A.M. modulation due to distortion or limiting is cancalled out in the demodulating arms of the system. Matched R.F. chokes are provided to discriminate against unwanted signals.

BRIEF DESCRIPTION OF THE DRAWING

The drawing is a circuit schematic of the invention.

DESCRIPTION OF THE PREFERRED EMBODIMENT

The invention is shown in the drawing where a first source Q3 and a first capacitor C1 are connected in series between ground and a first terminal T1. A first inductor L1 and a second capacitor C2 are connected in series between ground and terminal T1 in parallel with source Q3 and capacitor C1. A second terminal T2 is connected between inductor L1 and capacitor C2.

A second source Q1 and a first resistor R1 are series connected between ground and a third terminal T3. A second inductor L2 is connected between ground and terminal T3 in parallel with source Q1 and resistor R1. A series circuit comprised of a third capacitor C3 and a first diode CR1 is connected between ground and terminal T3 and in parallel with inductor L2. The anode of CR1 is grounded. A fourth terminal T4 is connected between capacitor C3 and diode CR1. A series circuit comprised of a third inductor L3 and a fourth capacitor C4 is connected between ground and terminal T4, in parallel with diode CR1. A fifth terminal T5 is connected between inductor L3 and capacitor C4.

A second diode CR2 has its anode connected to T1 and its cathode connected to T3.

Two resistors R2 and R3 are connected in series between T2 and T5. A fourth resistor R4 is connected between T2 and a positive source of D.C. voltage. A fifth resistor R5 is connected between terminal T5 and a negative source of D.C. voltage. The balanced modulator output voltage appears at a terminal T6 between R2 and R3.

L1 and L3 are R.F. chokes that present a high reactance to signals above the desired frequencies. L1 and L3 present equal values of reactance to the undesired frequencies in order to balance the circuit. R2 and R3 are of equal value for the same reason. R4 and R5 are equal to each other and serve to forward bias CR1 and CR2, this insuring that the diodes conduct in unison. C1, C2, C3, and C4 are equal to each other to preserve phase and response. CR1 and CR2 need not be matched but must have similar characteristics. L2 provides a D.C. return for the forward biasing of CR2. R1 is a limiting resistor.

Elements having the following values have been used successfully in the preferred embodiment:

| | |
|---|---|
| C1, C2, C3, and C4 | 500 $\mu\mu$f. |
| L1, L3 | 330 $\mu$h. R.F. chokes. |
| R2, R3 | 1.96 K. |
| R1 | 91 $\Omega$. |
| CR1, CR2 | IN 3064 diodes. |
| L2 | 8.2 $\mu$h. |
| R4, R5 | 33 K. |

Q3 must be a low impedence source to maintain balance in the demodulating arms; in the preferred embodiment Q3 has an impedance of 17 ohms.

Obviously many modifications and variations of the present invention are possible in the light of the above teachings. It is therefore to be understood that within the scope of the appended claims the invention may be practiced otherwise than as specifically described.

I claim:

1. In a balanced modulator circuit with a single ended input, the improvement comprising a first source connected in series with a first capacitor between ground and a first terminal, a second capacitor and a first inductor series connected between ground and said first terminal, a second terminal between said first inductor and said second capacitor, a second source connected in series with a first resistor between ground and a third terminal, a second inductor connected between ground and said third terminal, a first diode and a third capacitor connected in series between ground and said third terminal, the anode of said first diode being grounded, a fourth terminal connected between said diode and said third capacitor, a fourth capacitor and third inductor connected in series between ground and said fourth terminal, a fifth terminal between said fourth capacitor and said third inductor, a second resistor and a third resistor connected in series between said second terminal and said fifth terminal, a fourth resistor between said second terminal and a positive D.C. source, a fifth resistor between said fifth terminal and a negative D.C. source, a second diode with its anode connected to said first terminal and its cathode connected to third terminal, and a modulator output terminal between said second resistor and said third resistor.

References Cited

UNITED STATES PATENTS

| | | | |
|---|---|---|---|
| 2,777,992 | 1/1957 | Anderson | 332—24 |
| 2,887,662 | 5/1959 | Manduech | 332—16 |
| 3,025,418 | 3/1962 | Brahm | 307—295 X |
| 3,153,206 | 10/1964 | Fisher | 332—29 |
| 3,287,626 | 11/1966 | Sprague | 307—295 X |

ALFRED L. BRODY, Primary Examiner

U.S. Cl. X.R.

307—295; 325—147; 332—23, 29